United States Patent
Herber

(10) Patent No.: US 7,691,310 B2
(45) Date of Patent: Apr. 6, 2010

(54) SHOE AND METHOD FOR PRODUCTION OF THE SHOE

(75) Inventor: Karl-Heinrich Herber, Sinntal-Mottgers (DE)

(73) Assignee: ALSA GmbH, Steinau-Uerzell (DE)

( * ) Notice: Subject to any disclaimer, the term of this patent is extended or adjusted under 35 U.S.C. 154(b) by 458 days.

(21) Appl. No.: 10/572,537

(22) PCT Filed: Sep. 20, 2004

(86) PCT No.: PCT/DE2004/002100

§ 371 (c)(1),
(2), (4) Date: Mar. 17, 2006

(87) PCT Pub. No.: WO2005/027672

PCT Pub. Date: Mar. 31, 2005

(65) Prior Publication Data

US 2007/0120293 A1    May 31, 2007

(30) Foreign Application Priority Data

Sep. 19, 2003  (DE) ................................ 103 43 886

(51) Int. Cl.
*B29C 39/00* (2006.01)
(52) U.S. Cl. ............................ 264/244; 264/299; 36/12; 36/18; 36/19 A; 12/142 A; 12/142 C; 12/142 T
(58) Field of Classification Search ................. 264/299, 264/244; 12/146 RS, 146 T, 142 A, 142 C, 12/142 T; 36/12, 18, 19
See application file for complete search history.

(56) References Cited

U.S. PATENT DOCUMENTS 4,003,145 A * 1/1977 Liebscher et al. ......... 36/17 PW
4,333,193 A * 6/1982 Bartneck ................ 12/142 RS (Continued)

FOREIGN PATENT DOCUMENTS

DE          17 23 915          6/1956

(Continued)

OTHER PUBLICATIONS

PCT/ISA/210.

(Continued)

*Primary Examiner*—Christina Johnson
*Assistant Examiner*—Magali P Théodore
(74) *Attorney, Agent, or Firm*—Crowell & Moring LLP

(57) ABSTRACT

According to the invention, a shoe is produced by firstly forming a shoe upper piece (8), made up of an upper (7) and an inner sole (5), sewn to the upper (7), which is bonded to a sole (4) in the assembled shoe. A sole tread (2) is introduced into a casting mould (1) and then filled with a cork/latex mixture in a pasty state. A fillet (9) is then introduced into the shoe upper piece (8) and the unit thus produced, placed from above into the casting mould (1), such that the casting mould (1) is sealed thereby. It is important that only the sole edge (10) rests on the edge of the casting mould (11) and the fillet (7) is fixed internally to the inner sole (5), such that the shoe base material presses the inner sole (5) against the edge of the upper (12), lying on the fillet (9).

9 Claims, 2 Drawing Sheets

U.S. PATENT DOCUMENTS 4,562,606 A * 1/1986 Folschweiler ........... 12/142 RS

FOREIGN PATENT DOCUMENTS

| DE | 10 29 264 A | 4/1958 |
|---|---|---|
| DE | 19 06 420 U | 12/1964 |
| DE | 12 31 885 A | 1/1967 |
| DE | 21 02 057 A | 7/1972 |
| DE | 28 30 605 | 1/1980 |
| DE | 30 43 725 | 6/1982 |
| DE | 196 29 017 A | 1/1998 |
| DE | 101 56 529 | 5/2003 |
| FR | 2 564 301 | 11/1985 |
| GB | 708 502 | 5/1954 |
| GB | 1 482 277 | 8/1977 |
| JP | 01 265 901 | 10/1989 |
| WO | WO 99 47012 | 9/1999 |

OTHER PUBLICATIONS

German Search Report (w/English Translation) for DE 101 56 529.1.
PCT Search Report for PCT application (PCT/DE02/04238) related to DE 101 56 529.1.

* cited by examiner

SHOE AND METHOD FOR PRODUCTION OF THE SHOE

This application claims the priority of International Application No. PCT/DE2004/002100, filed Sep. 20, 2004, and German Patent Document No. 103 43 886.6, filed Sep. 19, 2003, the disclosures of which are expressly incorporated by reference herein.

BACKGROUND AND SUMMARY OF THE INVENTION

The invention relates to a method for the production of shoe with a sole, created within a casting mold featuring an upper casting mold edge, and an upper piece, which is formed of an upper and an inner sole that is fastened to the upper and bonded to the sole in the assembled shoe, which projects towards the side with an inner sole edge, wherein a fillet is introduced into the shoe upper piece that is comprised of inner sole and upper and the shoe upper piece now with fillet inserted, after filling in the shoe base material to seal the casting mold, is placed with its inner sole edge on the casting mold edge and to seal the casting mold by means of a pressing frame is pressed from above on the inner sole edge and thus on the casting mold edge so that a connection between the inner sole and the sole is then produced in the casting mold by the fluid shoe base material, and in which the inner sole edge is separated after demolding the shoe.

A method of foregoing type is the subject of German Patent Document No. DE 101 56 529 A1. In the case of the known method, the inner sole edge and the edge of the upper rest on top of each other on the edge of the casting mold. The edge of the upper is folded towards the outside for this purpose. As a result, one sees the folded edge of the upper on the side in the finished shoe just like with a shoe with a flexible design. If the shoe in question is a sandal or another shoe in which the upper does not run over the entire outside periphery of the shoe sole, then, because of this design, one sees the edge of the inner sole in some areas when viewed from above and in other areas the edge of the upper that has been folded to the outside, which produces an appearance that is often considered to be disadvantageous.

The invention is based on the objective of developing a method of the type cited at the outset in such a way that the edge of the inner sole material remains visible all around in the finished shoe.

This objective is attained in accordance with the invention in that only the inner sole edge rests on the edge of the casting mold and the upper is fixed internally to the inner sole such that the shoe base material presses the inner sole against the edge of the upper that is adjacent to the fillet.

As a result of such a method, the edge of the inner sole leather remains visible all around, lending the finished shoe a very high-quality optical appearance. In contrast to expectations, the edge of the upper does not project against the inner sole towards the foot, because the expanding shoe base material presses the inner sole so strongly against the edge of the upper and the fillet that the edge of the upper is pressed into the material of the inner sole. As a result, no scarfing of the upper parts is required after the expanding of the shoe sole.

The upper is connected especially solidly to the inner sole if, according to a development of the method in accordance with the invention, the edge of the upper is connected to the inner sole by a seam.

The method in accordance with the invention is particularly advantageously applicable if the upper is the strap of a sandal.

BRIEF DESCRIPTION OF THE DRAWINGS

The invention allows for various embodiments. In order to elucidate the basic principle of the invention the figures depict the following and are described below.

DETAILED DESCRIPTION OF THE DRAWINGS

Figure 1:
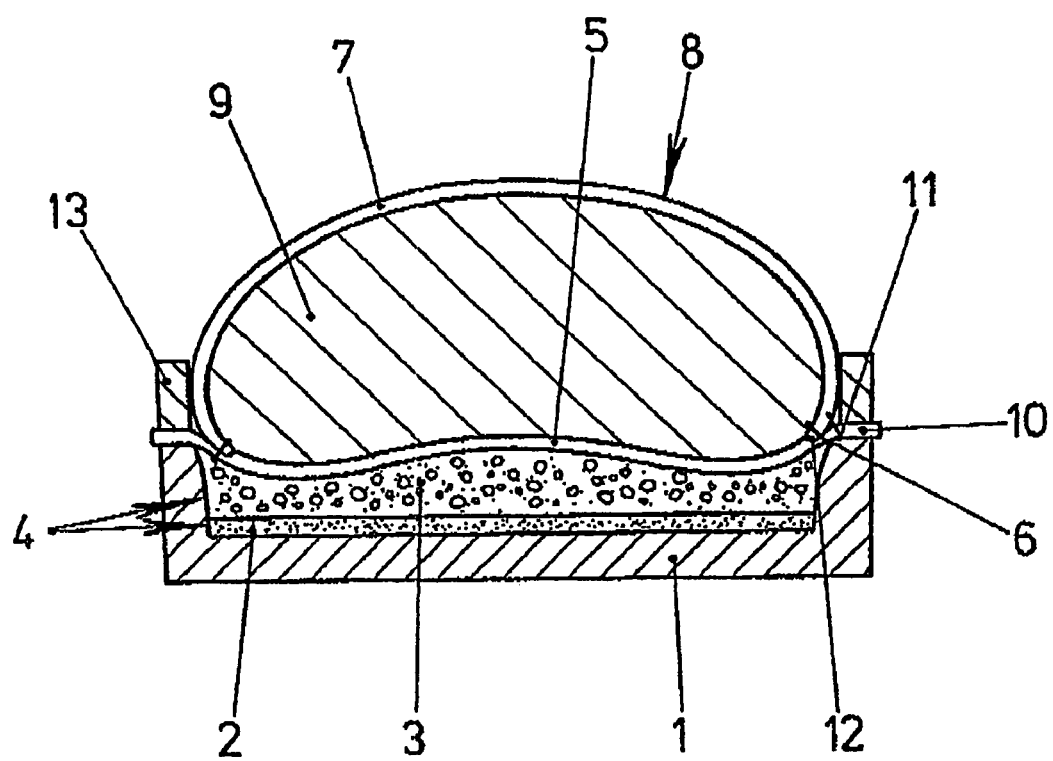
FIG. 1 is a cross section through a casting mold with a shoe inserted into it.

The drawings show a casting mold 1 into which a sole tread 2 made of wear-resistant material that completely fills out the free interior cross section of the mold was first inserted from above. Then one fills a sole material into the casting mold 1, in particular a cork/latex mixture, which creates an insole 3 in a finished state. This insole 3 forms a shoe sole 4 together with the sole tread 2.

The insole 3 is covered towards the top by an inner sole 5, which is connected to an upper 7 by means of a seam 6, thereby creating a shoe upper piece 8. The required shape of the shoe upper piece 8 is created by a fillet 9 inserted into the upper piece.

Important to the method is that the upper 7 has an upper edge 12, which, in contrast to the method according to the cited DE 101 56 529 A1, is not folded to the outside, but runs on the inner side of the inner sole 5 in the plane of the edge region of the insole 3 and is sewed to it there by the seam 6.

After insertion of the sole tread 2 and filling in the cork/latex mixture that forms the insole 3, the shoe upper piece 8 with the fillet 9 is placed from above into the casting mold 1.

In doing so, an inner sole edge 10 ends up on the upper edge of the casting mold 11. A pressing frame 13 is then placed on the inner sole edge 10 from above so that the pressing frame 13 can press the inner sole edge 10 on the casting mold edge 11 thereby closing and sealing the casting mold 1. Finally, the casting mold 1 is heated, which compresses the cork/latex mixture and produces close contact between the cork/latex mixture and the inner sole 5 and the sole tread 2 thereby reliably connecting these parts.

Figure 2:
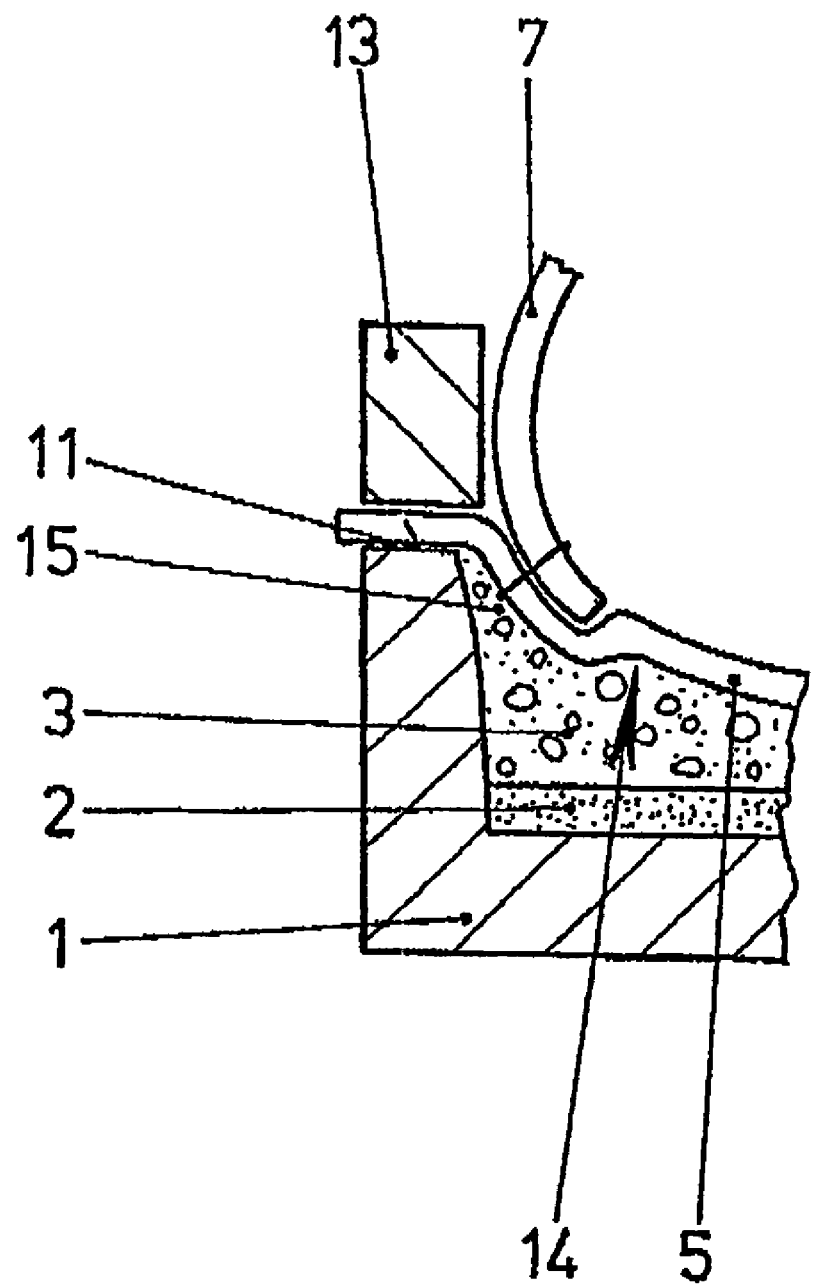
FIG. 2 is an enlarged section from FIG. 1.

During heating pressure is exerted between the base of the fillet 9 and the cork/latex mixture. As a result, the edge presses into the inner sole 5, which itself presses into an indention 14 forming in the cork/latex mixture. Although the edge of the upper 7 is not beveled, but cut off straight, the result is a smoother transition between the surface of the upper 7 facing the foot and the inner sole 5 since the upper 7 is pressed into the inner sole corresponding to the thickness of its material. FIG. 2 shows an enlarged depiction of this. A step in the transition between the upper 7 and the inner sole 5, which would be unpleasantly noticeable when the shoe is worn on the foot, does not appear.

In addition, the pressing frame 13 projects over the edge of the edge of the casting mold rim 11 at least in the region of the upper 7 so that an adhesive edge 15 lying outside of the upper 7 is formed, at which the edge of inner sole 5 is directly glued to the insole 3.

After cooling the casting mold 1 and demolding the shoe upper piece 8, the projecting inner sole edge 10 is cut off, thereby completing the shoe.

LIST OF REFERENCE NUMBERS

1 Casting mold
2 Sole tread
3 Insole
4 Shoe sole

5 Inner sole
6 Seam
7 Upper
8 Shoe upper piece
9 Fillet
10 Inner sole edge
11 Casting mold edge
12 Edge of upper
13 Pressing frame
14 Indentation
15 Adhesive edge

The invention claimed is:

1. A method for production of a shoe with a sole, created within a casting mold featuring an upper casting mold edge, and an upper piece which is formed of an upper and an inner sole that is fastened to the upper, the upper piece bonded to the sole in an assembled shoe and wherein the inner sole completely covers a top of an insole of the shoe, wherein a fillet is introduced into the shoe upper piece and the shoe upper piece with fillet inserted, after filling in a shoe base material in the casting mold, is placed from above into the casting mold, placing an inner sole edge of the inner sole on the casting mold edge, placing a pressing frame on the inner sole edge, and thus on the casting mold edge, wherein only the inner sole edge rests on the edge of the casting mold and wherein the upper is fixed internally to the inner sole such that the shoe base material presses the inner sole against an edge of the upper that lies against the fillet.

2. The method according to claim 1, wherein the edge of the upper is connected to the inner sole by a seam.

3. The method according to claim 1, wherein the upper is a strap of a sandal.

4. A method for production of a shoe, comprising the steps of:
    placing an edge of an inner sole on an edge of a casting mold, wherein the inner sole completely covers a top of an insole of the shoe;
    placing an edge of a shoe upper piece within the casting mold and disposed inside of an inner side of the inner sole; and
    pressing the edge of the shoe upper piece into the inner side of the inner sole.

5. The method according to claim 4, wherein the step of pressing the edge of the shoe upper piece into the inner side of the inner sole includes the step of expanding a shoe base material.

6. The method according to claim 4, wherein the step of pressing the edge of the shoe upper piece into the inner side of the inner sole includes the step of pressing the edge into the inner side of the inner sole to form an indentation in the inner side of the inner sole.

7. The method according to claim 6, wherein an inner surface of the shoe upper piece is aligned with an inner surface of the inner side of the inner sole.

8. The method according to claim 4, further comprising the step of sewing the shoe upper piece to the inner sole.

9. A method for production of a shoe, comprising the steps of:
    placing an edge of an inner sole on an edge of a casting mold, wherein the inner sole completely covers a top of an insole of the shoe;
    placing an edge of a shoe upper piece within the casting mold and disposed inside of an inner side of the inner sole; and
    pressing the edge of the shoe upper piece into the inner side of the inner sole such that the upper piece is fixed internally to the inner sole and such that a shoe base material presses the inner sole against the edge of the upper piece that lies against a fillet disposed in the upper piece, and wherein the step of pressing the edge of the shoe upper piece into the inner side of the inner sole includes the step of expanding the shoe base material.

* * * * *